US006337059B1

(12) United States Patent
Schubert et al.

(10) Patent No.: US 6,337,059 B1
(45) Date of Patent: Jan. 8, 2002

(54) ABSORBENT COMPOSITIONS FOR THE REMOVAL OF ACID GASES FROM GAS STREAMS

(75) Inventors: Craig Norman Schubert, Belle Mead, NJ (US); Paulino Forte, Yonkers, NY (US); John Wayne Dean, Clinton, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/304,283

(22) Filed: May 3, 1999

(51) Int. Cl.[7] .................. B01D 53/40; B01D 53/48; B01D 53/62
(52) U.S. Cl. ............... 423/210; 423/242.7; 423/228; 423/229; 252/182.12; 252/189; 252/190
(58) Field of Search .................. 423/228, 229, 423/210, 242.7; 252/182.12, 190, 189

(56) References Cited

U.S. PATENT DOCUMENTS

| 4,336,233 A | 6/1982 | Appl et al. ................. 423/228 |
| 4,696,803 A | 9/1987 | Nieh ........................ 423/228 |
| 4,775,519 A | 10/1988 | Yit Nieh .................... 423/226 |
| 4,997,630 A | 3/1991 | Wagner et al. .............. 423/228 |
| 5,618,506 A | * 4/1997 | Suzuki ...................... 423/228 |
| 5,648,053 A | * 7/1997 | Mimura ..................... 423/228 |
| 5,736,115 A | 4/1998 | Iijima et al. ................ 423/228 |
| 5,853,680 A | * 12/1998 | Iijimn ....................... 423/229 |

FOREIGN PATENT DOCUMENTS

EP 0705637 4/1996

OTHER PUBLICATIONS

"Desorption of $CO_2$ from MDEA and Activated MDEA Solutions", Xu et al., *Ind. Eng. Chem. Res.* 1995, 34, pp. 874–880.
"Gas–Liquid Equilibrium in a $CO_2$–MDEA–$H_2O$ System and the Effect of Piperazine on It", Xu et al., *Ind. Eng. Chem. Res.* 1998, 37, pp. 1473–1477.
"Kinetics Study on Absorption of Carbon Dioxide into Solutions of Activated Methyldiethanolamine", Xu et al., *Ind. Eng. Chem. Res.* 1992, 31, pp. 921–927.

* cited by examiner

*Primary Examiner*—Steven P. Griffin
*Assistant Examiner*—Timothy C Vanoy

(57) ABSTRACT

An absorbent composition for the removal of acid gases, such as $CO_2$, $H_2S$ and COS, from gas streams is provided. The absorbent composition comprises an aqueous solution comprising: 1) greater than 1 mole piperazine per liter of aqueous solution; and 2) about 1.5 to about 6 moles methyldiethanolamine per liter of aqueous solution.

11 Claims, 1 Drawing Sheet

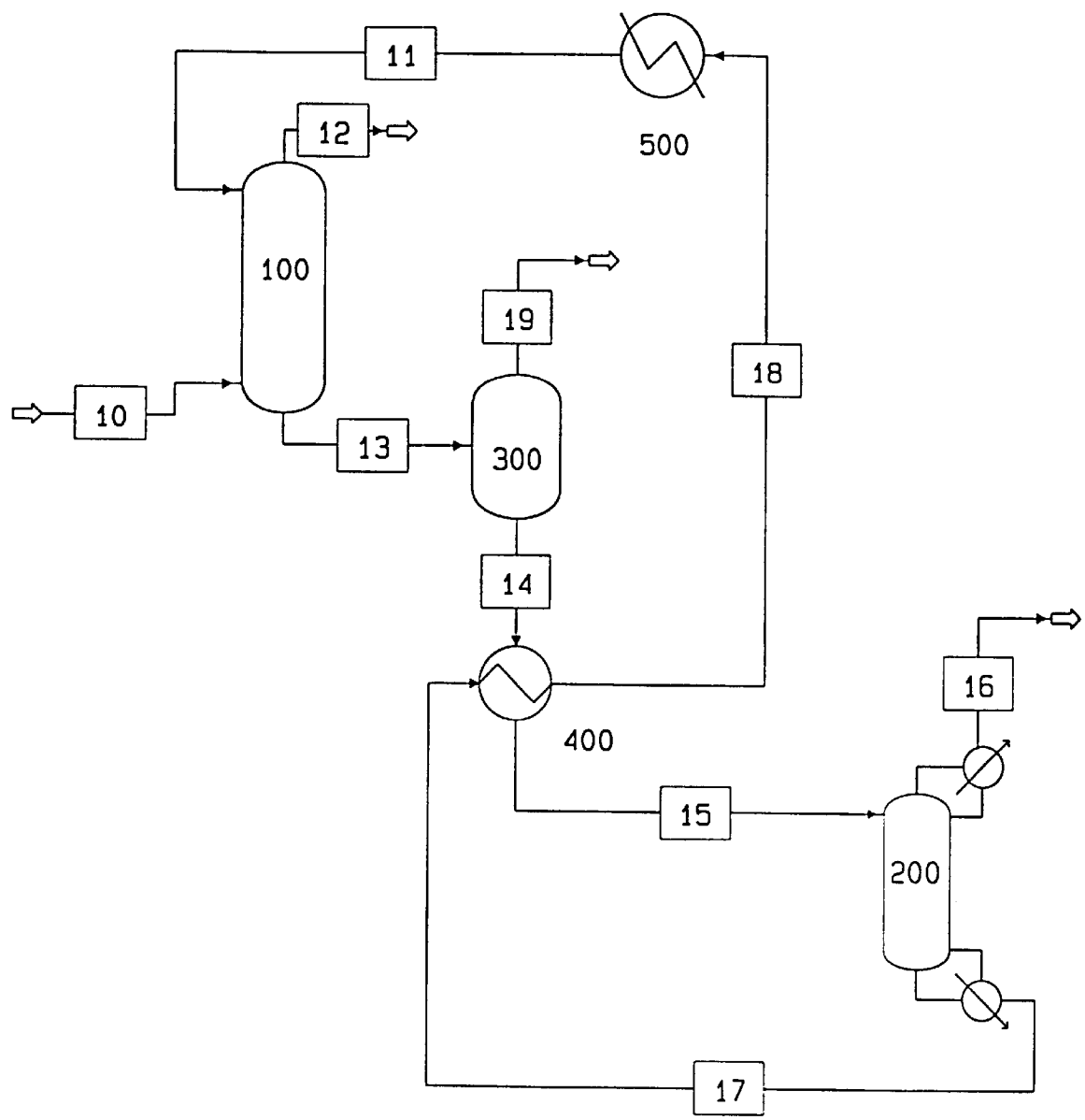

ABSORBENT COMPOSITIONS FOR THE REMOVAL OF ACID GASES FROM GAS STREAMS

The present invention relates to an improved absorbent composition comprising an aqueous solution of piperazine and methyldiethanolamine for the removal of acid gases, such as $CO_2$, $H_2S$ and COS, from gas streams.

BACKGROUND OF THE INVENTION

Gas streams from natural gas wells, refineries and the like typically contain undesirable acid gases such as $CO_2$, $H_2S$, COS, and mercaptans. Aqueous amine solutions are known to be useful for the absorption of acid gases from these types of gas streams. Typically an acid gas-rich gas stream is contacted with an aqueous absorbent composition comprising an amine solution at low temperature or high pressure in an absorber. The aqueous amine solution usually contains an alkanolamine such as triethanolamine (TEA), methyldiethanolamine (MDEA), diethanolamine (DEA), monoethanolamine (MEA), diisopropanolamine (DIPA) or hydroxyaminoethyl ether (DGA). Once the acid gases are removed from the gas stream, it is ready for sale or additional downstream conditioning. The acid gas rich solution is regenerated for reuse by driving off the absorbed gases in specialized equipment such as flash tanks and/or stripper columns typically operated at high temperature or low pressure.

Workers in the art have found that certain compounds, such as piperazine and monomethylethanolamine (MMEA) may be advantageously added to aqueous amine solutions to enhance their absorption capabilities. For example, U.S. Pat. No. 4,336,233 to Appl et al. discloses a process for removing $CO_2$, $H_2S$ and in some cases COS from gases that contain these compounds by washing the gases with aqueous solutions containing MDEA and piperazine as an absorption accelerator. The amount of piperazine stated to be useful in these absorbent compositions is up to 0.8 moles per liter of aqueous solution. The '233 patent also discloses that it is particularly preferred to add from 0.05 to 0.4, especially from 0.2 to 0.4, moles piperazine per liter of aqueous solution.

U.S. Pat. No. 4,997,630 to Wagner et al. discloses a staged process for the removal of $CO_2$ and/or $H_2S$ using an aqueous absorption liquid containing MDEA. The aqueous absorption liquid may additionally contain from 0.05 to 1, preferably 0.1 to 0.8, mole per liter piperazine.

In contrast with the teachings of the prior art, applicants have discovered that improved absorbent compositions for the removal of acid gases from gas streams instead comprise aqueous MDEA/piperazine solutions containing greater than 1 mole piperazine per liter of aqueous solution. In particular, aqueous solutions containing greater than 1 mole piperazine per liter of aqueous solution and about 1.5 to about 6 moles MDEA per liter of aqueous solution have been found to provide superior absorption capabilities over aqueous MDEA/piperazine solutions containing 1 mole or less piperazine per liter of aqueous solution. The present MDEA/piperazine absorbent compositions advantageously provide equivalent $CO_2$ removal at reduced absorbent composition circulation rates in the absorber and increased absorber temperature, as well as improved performance of downstream regeneration equipment.

SUMMARY OF THE INVENTION

The invention provides an absorbent composition for the removal of acid gases from gas streams, comprising an aqueous solution comprising: 1) greater than 1 mole piperazine per liter of aqueous solution; and 2) about 1.5 to about 6 mole methyldiethanolamine per liter of aqueous solution.

The invention further provides a process for the removal of acid gases from a gas stream. A gas stream containing an acid gas contacts the above absorbent composition to produce a sweet gas stream and an acid gas-rich absorbent composition stream.

BRIEF DESCRIPTION OF THE DRAWING

The FIGURE illustrates a process flow diagram of an absorption process according to the present invention.

DETAILED DESCRIPTION OF THE INVENTION

The absorbent composition comprises an aqueous solution of piperazine and MDEA. The amount of piperazine in the aqueous solution is critical to the invention, and must be greater than 1 mole piperazine per liter of aqueous solution. Preferably, the amount of piperazine is greater than about 1.1 mole piperazine per liter of aqueous solution, and more preferably is greater than about 1.2 mole piperazine per liter of aqueous solution.

The amount of MDEA in the aqueous solution ranges from about 1.5 to about 6 moles MDEA per liter of aqueous solution. Preferably, the amount of MDEA ranges from about 2.5 to about 5.5 moles MDEA per liter of aqueous solution, more preferably from about 2.9 to about 4.2 moles MDEA per liter of aqueous solution.

The balance of the absorbent composition may be water, or the absorbent composition may optionally also comprise one or more other chemical solvents or physical solvents. For example, amines, such as ethyldiethanolamine, methylethanolpropanolamine, ethylethanolpropanolamine, methyldipropanolamine, triethanolamine, diethanolamine, monoethanolamine, hydroxyaminoethyl ether or diisopropanolamine may be used as additional chemical solvents. Physical solvents such as sulfolane or methoxytriglycol may also be employed. When such chemical or physical solvents are used, they preferably make up from about 5 to about 50 weight percent of the absorbent composition, more preferably from about 10 to about 40 weight percent of the absorbent composition.

The absorption composition may also contain additives such as corrosion inhibitors, defoamers, and the like. Typically, the concentration of such additives ranges from about 0.01 to 5 weight percent based on the weight of the absorbent composition on an anhydrous basis. The use of such additives is well known to those skilled in the art.

Any gas containing an acid gas can be treated according to the present invention. The sources of such gases are not critical to the invention and include, for example, natural gas wells, synthesis gas streams and refinery gas, including refinery coker off-gas, refinery fluid catalytic cracker off-gas, refinery hydrogen units, and other refinery gas streams. Typically, these gas streams contain one or more of the following acid gases: mercaptans, $CO_2$, $H_2S$, and COS. It is also not uncommon for these gas streams to contain one or more of the following: $SO_2$, $SO_3$, $CS_2$, HCN and oxygen. Mercaptans are often present in amounts ranging from about 10 to 10,000 ppmv. Up to about 90 mole percent of $H_2S$ may be present as well. $CO_2$ is typically present in amounts ranging up to about 50 mole percent, often from about 1 to 15 mole percent. COS, when present, typically comprises from about 2 to 10,000 ppmv. The remainder of such gases is usually hydrocarbons, hydrogen, carbon monoxide, nitrogen and other light gases.

Gas streams containing acid gases are treated to remove the acid gases by contacting with the absorbent composition of the invention. Preferably, the used absorbent composition, that is, the acid gas-rich absorbent composition, is regenerated to remove all or part of the absorbed acid gases, and then recycled to the absorption step. Any equipment known in the art may be used for absorption, regeneration, and the rest of the process.

The FIGURE is a flow diagram of a typical process for the removal of acid gases in accordance with the invention. A feed gas stream containing acid gases is introduced to absorption zone 100 via line 10. Absorption zone 100 comprises a gas-liquid contacting tower containing suitable trays or packing material to conduct absorption. Details concerning the apparatus used in the absorption zone are known to those skilled in the art. The absorption zone is typically operated at a temperature of about 25 to 90° C. and a pressure of about 15 to 1500 psia.

In absorption zone 100, the feed gas stream introduced via line 10 is contacted with the absorbent composition stream introduced via line 11. A product gas stream that is depleted in the acid gases relative to the feed gas stream is discharged from absorption zone 100 via line 12. Preferably, at least about 50 percent of the acid gases are removed from the feed gas stream in absorption zone 100. An acid gas-rich absorbent composition stream is withdrawn from absorption zone 100 via line 13.

The acid gas-rich absorbent composition may pass through one or more flash zones. The FIGURE shows one such zone (300). A fraction of the absorbed gases is separated from the acid gas-rich absorbent composition and emerges in line 19. The balance of the material in line 13 emerges from flash zone 300 via line 14.

The acid gas-rich absorbent composition stream is introduced via line 15 to a regeneration zone 200 wherein remaining acid gases are desorbed from the absorbent composition. Regeneration zone 200 often comprises a distillation/steam stripping tower containing suitable trays or packing material to desorb the absorbed acid gases. Details concerning the apparatus in regeneration zone 200 are known to those skilled in the art. Regeneration zone 200 is typically operated at a temperature of about 100° to 130° C. and a pressure of about 15 to 50 psia. A portion of the vapors emerging from the top of the regeneration zone 200 may optionally be condensed and returned to the process. All remaining vapors are discharged from the regeneration zone via line 16.

A regenerated absorbent composition stream, which is depleted in acid gases relative to the acid gas-rich absorbent composition stream, is withdrawn from regeneration zone 200. A portion of the regenerated absorbent composition stream is commonly passed to a reboiler and reintroduced to regeneration zone 200. The remainder of the regenerated absorbent composition stream is recycled to absorption zone 100 via lines 17, 18 and 11.

The regenerated absorbent composition is commonly cooled before being reused in absorption zone 100. Cooling of the regenerated absorbent composition can be accomplished with standard equipment known to those skilled in the art. For example, in the FIGURE heat is exchanged between absorbent composition streams using a lean rich exchanger in cooling zone 400 and heat is removed from the system using a conventional heat exchanger in cooling zone 500.

The process illustrated in the FIGURE is provided as an example. Workers in the art have devised many process variations to optimize the performance of a particular absorbent composition or to minimize capital or operating costs associated with acid gas removal from a particular sour gas stream. These variations include multiple absorption zones or increased reliance on flash zones for rich absorbent regeneration (up to and including elimination of the stripping zone).

The relatively high level of piperazine in the absorbent composition results in a number of improvements in absorption performance. Most notably, an equivalent amount of $CO_2$ can be removed from an acid gas-rich gas stream at a lower absorbent composition circulation rate using the present absorbent composition. Equivalent $CO_2$ removal at lower absorbent composition circulation rates reduces the size and capital cost of vessels, heat exchangers, pumps, and associated piping. Lower absorbent composition circulation rates also eliminate operating costs associated with pumping, heating and cooling the extra liquid.

Alternatively, the amount of $CO_2$ removed from a gas stream contacted with the absorbent composition is increased at a given absorbent composition circulation rate. Hence, the capacity and profitability of existing equipment can be measurably improved using the present absorbent composition.

Moreover, the present absorbent composition allows for operation at higher absorber temperatures, which is advantageous because high liquid phase temperatures typically reduce or limit absorption. Hence, an absorbent composition which provides equivalent acid gas removal at higher liquid phase temperatures is superior to an absorbent composition which requires lower liquid phase temperatures. While not wishing to be bound by theory, it is likely there is a close relationship between the minimum absorbent composition circulation rate required to adequately clean a particular gas and the liquid phase temperature profile in the absorber. It is well known that absorption of $CO_2$ into aqueous amine solutions liberates heat of absorption into the circulating absorbent composition. Hence, as the circulation rate decreases, liquid phase absorber temperatures increase for a fixed degree of $CO_2$ removal.

The absorbent composition also provides for further advantages downstream in the acid gas removal process. For example, certain downstream equipment such as flash tanks and lean/rich exchangers commonly found in gas treating facilities typically operate better as the rich amine temperature increases. An acid gas-rich absorbent composition leaving the absorber at a higher temperature therefore provides operational benefits to the downstream equipment.

In addition to $CO_2$, the absorbent composition has absorption capacity for $H_2S$, COS and mercaptans. Accordingly, preferably the product gas stream removed via line 12 is also at least partially depleted in these acid gases relative to the feed gas stream. As is known in the art, the degree of removal of these other acid gases can be controlled by adjusting the equipment and conditions in the absorption process.

The following examples further illustrate the invention.

EXAMPLE 1

A gas stream containing $CO_2$ was treated in a pilot scale absorber to remove the $CO_2$. The absorber was a 10 ft. high, 2 inch inside diameter column packed with ¼ inch ceramic saddles. Lean absorbent was introduced at the top of the absorber and sour gas was introduced at the bottom. The two streams were contacted counter currently. The $CO_2$ rich absorbent left the absorber at the bottom. The sweet gas exited the absorber at the top.

The $CO_2$ rich absorbent was regenerated in an 8.5 ft high, 2 inch inside diameter stripper column packed with ¼ inch Protruded Pro-Pack packing. The stripper was equipped with a reboiler at the bottom and an overhead condenser at the top. Reflux water collected in the stripper overhead was returned to the circulating solution.

The above described pilot scale equipment, together with associated instruments for measurement of temperature, pressure, gas flow rate, liquid flow rate, gas phase composition, liquid phase composition etc. were used to measure the effect of piperazine concentration on the minimum circulation rate required to achieve a given degree of CO2 removal. The minimum absorbent circulation required to achieve a given amount of CO2 removal was determined by gradually decreasing circulation until the working capacity of the solvent was exhausted. At this point, an incremental reduction in circulation results in a rapid increase in the sweet gas concentration of CO2. However, restoring the missing circulation increment returns the sweet gas concentration to normal (less than 50 ppmv in this case).

This procedure provides a direct measurement of the working capacity of a particular absorbent composition in a typical absorber-stripper cycle. Other methods, such as those based on vapor liquid equilibrium measurements, require experience or simulation based corrections to account for the effects of typical process constraints such as elevated absorber temperatures, limited gas-liquid contact time, imperfect absorbent stripping etc.

The data in Table 1 demonstrate absorbent compositions containing more than 1.0 mole/liter piperazine provide equivalent CO2 removal at a lower liquid circulation rate. Furthermore, equivalent CO2 removal was achieved despite the higher absorption zone temperatures and the higher rich absorbent temperature. Surprisingly, these results were achieved, in this case, without a measurable increase in the heat requirement to strip CO2 from the rich absorbent.

TABLE 1

|  | 0.95M piperazine | 1.5M piperazine |
| --- | --- | --- |
| Sweet CO2 Concentration (ppmv) | <50 | <50 |
| Minimum Circulation Rate (g/min) | 230 | 210 |
| Bed Position 3 T (F) | 180 | 200 |
| Bed Position 4 T (F) | 188 | 201 |
| Bed Position 5 T (F) | 190 | 201 |
| Rich T (F) | 183 | 189 |
| Reboiler Duty (BTU/hr) | 4,550 | 4,530 |

EXAMPLE 2

The pilot scale equipment described in Example 1 can also be used to measure the effect of piperazine concentration on the volume of gas which can conditioned by a given set of equipment with a fixed flow rate of liquid absorbent. In this case the absorbent circulation rate is held constant and the sour gas flow rate is increased until the liquid absorbent capacity is exhausted and the sweet gas concentration of CO2 rises above a predetermined value (50 ppmv in this case).

The data in Table 2 demonstrate absorbent compositions containing more than 1.0 mole/liter piperazine allow the same equipment circulating the same amount of liquid absorbent to process more sour gas to a given specification.

TABLE 2

|  | 0.95M piperazine | 1.5M piperazine |
| --- | --- | --- |
| Sweet CO2 Concentration (ppmv) | <50 | <50 |
| Maximum Gas Throughput (SLPM) | 92.1 | 98.1 |
| Bed Position 3 T (F) | 180 | 165 |
| Bed Position 4 T (F) | 188 | 190 |
| Bed Position 5 T (F) | 190 | 198 |
| Rich T (F) | 183 | 191 |
| Reboiler Duty (BTU/hr) | 4,550 | 4,686 |

We claim:

1. An absorbent composition for the removal of acid gases from gas streams, comprising an aqueous solution comprising: 1) greater than 1.1 mole piperazine per liter of aqueous solution; and 2) about 1.5 to about 6 moles methyldiethanolamine per liter of aqueous solution.

2. The absorbent composition of claim 1, comprising greater than about 1.2 mole piperazine per liter of aqueous solution.

3. The absorbent composition of claim 1, comprising about 2.5 to about 5.5 mole methyldiethanolamine per liter of aqueous solution.

4. The absorbent composition of claim 1, comprising about 2.9 to about 4.2 mole methyldiethanolamine per liter of aqueous solution.

5. The absorbent composition of claim 1, further comprising an additional chemical solvent or a physical solvent.

6. The absorbent composition of claim 5, comprising a physical solvent selected from the group consisting of sulfolane or methoxytriglycol.

7. A process for the removal of acid gases from a gas stream, comprising contacting a gas stream containing an acid gas with an absorbent composition comprising an aqueous solution comprising: 1) greater than 1.1 mole piperazine per liter of aqueous solution; and 2) about 1.5 to about 6 moles methyldiethanolamine per liter of aqueous solution to produce an acid gas-lean gas stream and an acid gas-rich absorbent composition stream.

8. The process of claim 7, further comprising the subsequent steps of separating the acid gas-lean gas stream from the acid gas-rich absorbent composition stream; recovering the acid gas-lean gas stream as product; regenerating the acid gas-rich absorbent composition stream by removing acid gas therefrom to produce a regenerated absorbent composition; and recycling the regenerated absorbent composition to the contacting step of claim 7.

9. The process of claim 7, wherein the absorbent composition comprises about 2.5 to about 5.5 mole methyldiethanolamine per liter of aqueous solution.

10. The process of claim 7, wherein the absorbent composition further comprises an additional chemical solvent or a physical solvent.

11. The process of claim 7, wherein the regenerating step is conducted at a temperature in the range of about 100° to about 130° C.

* * * * *